United States Patent
Boon et al.

(10) Patent No.: US 6,883,761 B2
(45) Date of Patent: Apr. 26, 2005

(54) SUPPORT FOR TUBULAR MEMBERS

(75) Inventors: Brian Frederick Boon, North Andover, MD (US); Daniel D. Smith, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/366,159

(22) Filed: Feb. 13, 2003

(65) Prior Publication Data

US 2004/0159751 A1 Aug. 19, 2004

(51) Int. Cl.[7] .................................................. F16L 3/08
(52) U.S. Cl. ................ 248/74.1; 248/74.5; 248/229.24
(58) Field of Search .............................. 248/74.1, 68.1, 248/73, 74.4, 74.5, 229.24

(56) References Cited

U.S. PATENT DOCUMENTS

| | | | |
|---|---|---|---|
| 1,307,240 A | 6/1919 | Christopher | 403/217 |
| 2,712,167 A | 7/1955 | Blanchard | 24/569 |
| 3,188,138 A | 6/1965 | Lockshin | 297/248 |
| 3,199,062 A | 8/1965 | Wantz, Jr. | 439/479 |
| 3,856,244 A | 12/1974 | Menshen | 248/67.5 |
| 3,982,304 A | 9/1976 | Menshen | 248/68.1 |
| 4,273,465 A | 6/1981 | Schoen | 403/391 |
| 4,707,051 A | 11/1987 | Hall | 439/781 |
| 5,271,588 A | 12/1993 | Doyle | 248/68.1 |
| 5,794,897 A | 8/1998 | Jobin et al. | 248/74.4 |
| 5,941,483 A | 8/1999 | Baginski | 248/68.1 |
| 6,038,852 A | 3/2000 | Celi | 60/261 |

Primary Examiner—Anita M. King
(74) Attorney, Agent, or Firm—William Scott Andes; Alfred J. Mangels

(57) ABSTRACT

A two-piece clamping arrangement for engaging and holding an elongated element, such as a tubular conduit for fluids, or the like. An upper and a lower clamp member are provided to engage oppositely-facing surfaces of the elongated element. One of the upper or lower clamp members includes at least one longitudinally-arranged alignment surface to assure proper alignment of the clamp members when the clamp is assembled about the elongated element. The alignment surface also serves to stiffen the clamp member against bending and thereby serves to increase the holding force of the clamp assembly.

9 Claims, 2 Drawing Sheets

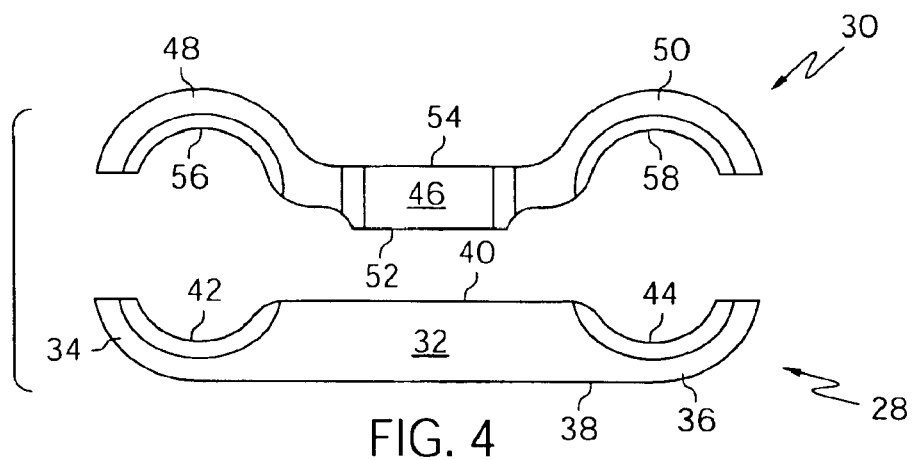
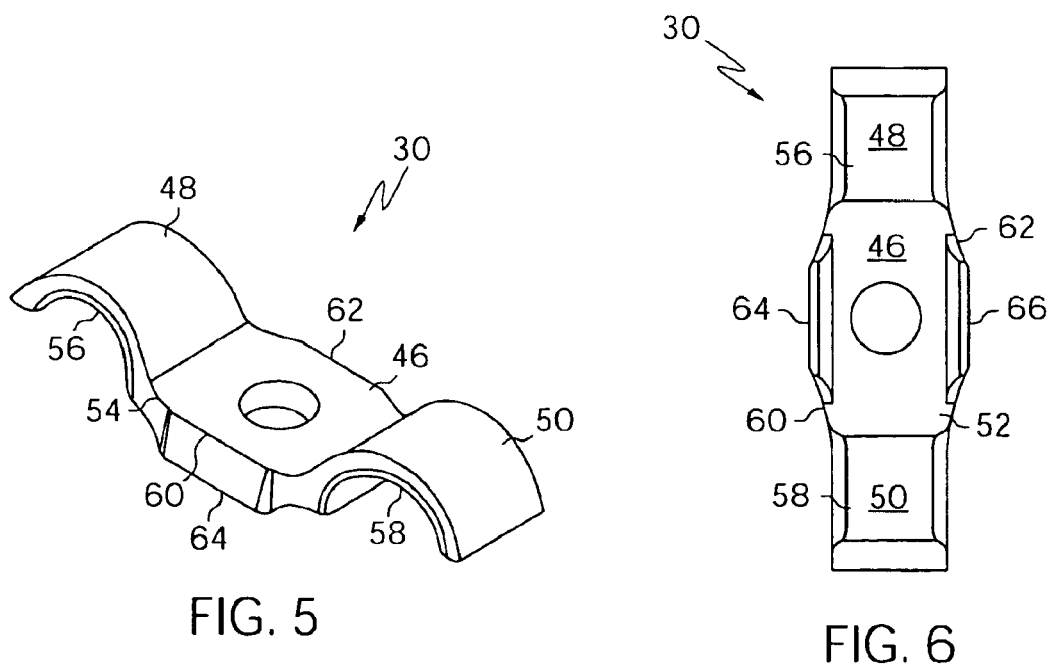

US 6,883,761 B2

SUPPORT FOR TUBULAR MEMBERS

STATEMENT REGARDING FEDERALLY SPONSORED DEVELOPMENT

This invention was made with U.S. government support under Contract No. N00019-96-C-0080 awarded by the Department of the Navy. The U.S. government has certain rights in this invention.

BACKGROUND OF THE INVENTION

The present invention relates to a support arrangement for supporting a tubular member. More particularly, the present invention relates to a support arrangement in the form of a two-piece clamping member for engaging and holding a tubular member, such as a fluid-carrying conduit, in a desired position against the effects of vibratory forces to which the tubular member is subjected.

Cylindrical members, such as support rods, or tubular conduits for carrying fluids, are often supported relative to a support surface or another component so that they are in a predetermined position, and also so that they are restrained from vibrating excessively, in order to avoid fatigue failure of the cylindrical member. Fluid-carrying conduits are generally found on various types of machinery for carrying pressurized gases, such as pressurized air, or pressurized liquids, such as hydraulic fluid. Because operating machinery generally often involves some degree of vibration, such conduits are frequently subjected to alternating vibratory forces that can cause excessive vibratory movement of the conduits. The vibratory movements must be minimized, or at least controlled, to avoid a resonant condition and also to avoid vibration-induced fatigue failure of the conduits.

Various supporting arrangements are known for supporting rods or conduits. Different forms of clamps have been devised to engage the rod or conduit and to hold it substantially steady relative to a surface of the equipment with which the conduit is associated. Generally, increased resistance to vibration-induced fatigue failure can be provided by increasing the size or weight of the clamp. However, in certain applications, such as in aircraft engines, the weight of the clamping arrangement must be minimized, while simultaneously providing the desired rigidity, the desired resistance to fatigue failure of the clamped member and of the clamp itself, and the desired ability simultaneously to withstand both the dynamic loads and the high temperature environment to which such elements are subjected during the operation of aircraft engines.

One form of tubing clamp that has been utilized on aircraft gas turbine engines includes two generally U-shaped clamp halves that are hingedly connected together at respective first ends thereof. The clamp halves can be opened to allow a tube to be positioned therebetween, and then pivoted together to enclose and surround the tube. Each such clamp half typically includes a generally semicircular recess to surround a portion of the outer surface the tube. A fastener, such as a threaded bolt, extends through openings formed in the ends of the tube clamp halves that are opposite to the hinged connection so that the bolt can be inserted through the openings. A connecting nut is threaded onto the bolt for drawing together the two clamp halves around the tube. The fastener typically also extends through an engine-mounted bracket for holding the tube relative to the outer surface of the engine casing.

The weight of the clamp structure can be minimized by forming it from a light weight metal, such as an aluminum alloy. But light weight metals often lack the necessary fatigue strength to withstand vibratory loads to thereby resist premature failure due to metal fatigue. Heavier metals, although generally more fatigue resistant, add weight to the structure, which is undesirable in an aircraft engine.

In addition to the fatigue aspects of known, hinged tubing clamp designs, tubing clamps that do not have a hinged connection can have tendency to rotate relative to each other during installation of a connecting bolt. Such relative rotation can cause the two parts of the clamp to be angularly skewed and misaligned relative to each other, which can cause the clamp members not to fully engage the conduit outer surface. In that condition edges of the clamp can bear against the outer surface of the conduit and result in stress concentrations within the conduit. Consequently, vibratory forces can cause the clamp edges to create irregular contact of the conduit outer surface over time and can lead to wear failure of the tubing.

BRIEF DESCRIPTION OF THE INVENTION

Briefly stated, in accordance with one aspect of the present invention, a support is provided for engaging and holding a tubular member. The support includes a first clamp member having a body and a first recess having a first longitudinal axis for engaging an outer surface of the tubular member. A second clamp member having a second longitudinal axis is provided also having a body, and a second recess for engaging the outer surface of the tubular member. At least one of the first clamp member and the second clamp member includes an alignment surface carried on the body portion for orienting the first and second clamp members relative to each other so that the first and second recesses are opposite each other and the longitudinal axes of the first and second recesses are substantially parallel. The first and second clamp members include means for receiving a connecting member to hold the clamp members against an outer surface of the tubular member.

BRIEF DESCRIPTION OF THE DRAWINGS

The structure, operation, and advantages of the present invention will become further apparent upon consideration of the following description, taken in conjunction with the accompanying drawings in which:

FIG. 4 is an exploded view of the clamp members shown in FIG. 2;

FIG. 5 is a top perspective view of the upper clamp member shown in FIG. 2; and

FIG. 6 is a bottom view of the upper clamp member shown in FIG. 2.

DETAILED DESCRIPTION OF THE INVENTION

Figure 1:
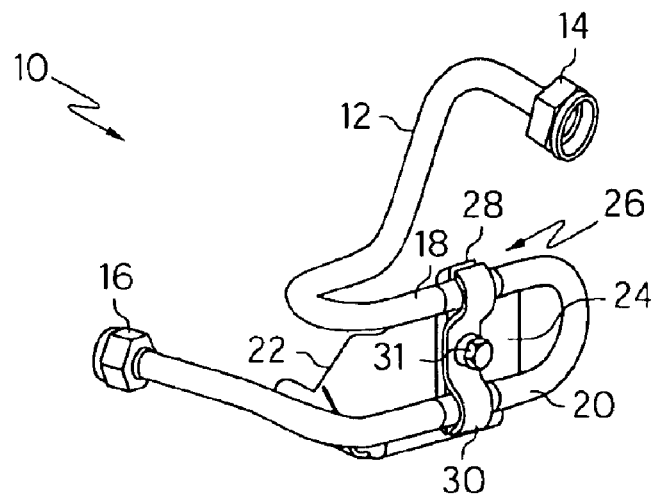
FIG. 1 is a perspective view of an embodiment of a tubing support having an improved clamp structure.

Referring now to the drawings, and particularly to FIG. 1 thereof, there is shown a tubing support arrangement 10 for a fluid-carrying tubular conduit 12 that has a first end connection 14 and a second end connection 16. Between first and second end connections 14, 16, tubular conduit 12 has a U-shape, defining a pair of tubing legs 18, 20. Although shown as a U-shaped arrangement involving only a single tubular conduit, it should be understood that tubing legs 18, 20 can also represent two distinct, non-interconnected tubes that are each carried by support arrangement 10. Additionally, although shown in the form of a support for a hollow tubular conduit, it will be appreciated that support 10 can also be utilized for holding one or more tubular or cylindrical elements, such as support rods, or electrical cable harnesses, or Bowden-type cables, and the like.

Support arrangement 10 includes a bracket 22 for attachment to a rigid surface or to another structural element (not shown) to secure the tubing legs in a predetermined position. Bracket 22 includes a surface 24 to which a two-piece tube clamp 26 can be attached. Tube clamp 26 includes a first clamping member 28 that rests against bracket surface 24, and a second clamping member 30 that overlies first clamping member 28. Tubing legs 18, 20 lie between first and second clamping members 28, 30 and are secured relative to bracket 22 by a connecting bolt 31 that passes through respective openings formed in each of clamping members 28, 30 and bracket 22. Arrangements of the type shown can be utilized for supporting and stabilizing cylindrical or otherwise-shaped elements against vibrations that are induced by operation of the machinery with which the supported elements are associated, or by external loadings of the machinery with which they are associated. For example, when utilized to secure and hold tubular conduits associated with an aircraft engine, the conduits can be subjected to vibratory forces induced by the engine operation or the operation of other components that are connected with the conduit. The conduits can also be subjected to loads induced by maneuvers undertaken by the aircraft itself, as well as combined aircraft-maneuver-induced loads superimposed upon the engine-induced vibratory forces.

Figure 2:
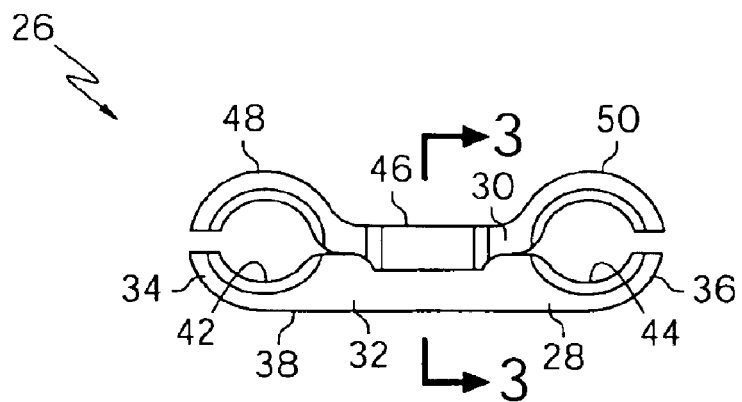
FIG. 2 is a side elevational view of the clamp members of the clamp structure shown in FIG. 1 with the clamp members in their operative, engaged relationship.
Figure 3:
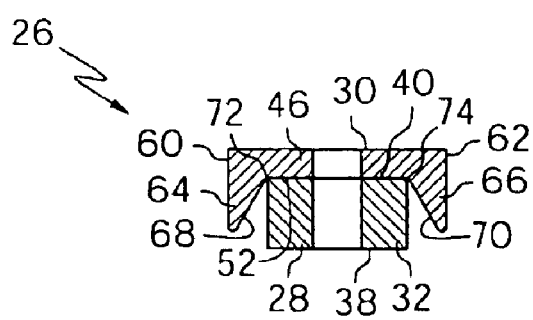
FIG. 3 is a cross-sectional view taken along the line 3—3 of FIG. 2.

Tube clamp 26, defined by first clamping member 28 and second clamping member 30, is shown in assembled, contacting relationship in FIG. 2 in a side elevational view, and is shown in FIG. 3 in a transverse cross-sectional view. First clamping member 28 includes a central body 32 that can be of generally rectangular configuration, as shown, and a pair of ends 34, 36 that are carried at respective longitudinal ends of central body 32. Central body 32 has a lower surface 38 that is adapted to engage against the surface of a bracket, such as bracket 22 shown FIG. 1, or against another, preferably rigid, surface. Body 28 includes an upper surface 40 that is substantially flat and that is adapted to engage in surface-to-surface contact with second clamping member 30, as will hereinafter be described. In the embodiment shown in FIG. 1, bracket surface 24 is flat, and therefore lower surface of first clamping member 38 is also flat, to allow substantial surface-to-surface contact for increased rigidity when first clamping member 28 is secured against a mounting surface.

Ends 34, 36 of first clamping member 28 are so shaped as to define upwardly-facing, element-engaging surfaces 42, 44, respectively, that are configured to correspond substantially in shape with the shape of a portion of the outer surface of the element to be supported. For supporting a tubular conduit having a circular cross section, such as tube 12 shown in FIG. 1, surfaces 42, 44 have an arcuate form, such as an arc of a circle having a radius corresponding substantially with the radius that defines the outer surface of the tube, to provide substantial surface-to-surface contact area and thereby minimize stress concentrations on the clamped element at the areas of contact between surfaces 42, 44 and the outer surface of the tubular conduit. It will be understood that the form of the outer surface of the element that is being clamped will dictate the preferred form of surfaces 42, 44.

Second clamping member 30 has an overall form that is similar to that of first clamping member 28. In that regard, and as best seen in FIGS. 5 and 6, second clamping member 30 includes a central body 46 that can be of generally rectangular configuration, as shown, and a pair of ends 48, 50 carried at respective longitudinal ends of central body 46. The lower surface 52 of central body 46 is adapted to engage against and to contact upper surface 40 of first clamping member 28 when the clamping members are assembled to form tube clamp 26 shown in FIG. 1. Lower surface 52 is therefore flat, or planar, to allow adequate surface-to-surface contact of central bodies 32 and 46. Upper surface 54 of central body 46 can be flat to provide a bearing surface against which can rest the head of a connecting bolt, an end surface of a washer, or an end surface of a connecting nut.

Ends 48, 50 of second clamping member 30 are so shaped as to define downwardly-facing, element-engaging surfaces 56, 58, respectively, that are configured to correspond substantially with the shape of a portion of the outer surface of the element to be supported. In that regard, surfaces 56, 58 can have a shape similar to that of surfaces 38, 40 of first clamping member 28. For supporting an element having a circular cross section, such as the tubular conduit shown in FIG. 1, surfaces 56, 58 can have an arcuate form, such as an arc of a circle having a radius corresponding substantially with the radius that defines the outer surface of the tubular conduit, to provide substantial surface-to-surface contact between second clamping member 30 and the tubular conduit and thereby minimize contact stress on the outer surface of the clamped tubular conduit at the regions of contact between surfaces 54, 56 and the outer surface of the tubular conduit. It will be understood that the form of the outer surface of the element that is being clamped will dictate the preferred form of surfaces 54, 56.

As shown in FIGS. 3 and 6, extending downwardly along longitudinal edges 60, 62 of central body 46 are a pair of depending ridges 64, 66, respectively. Ridges 64, 66 are substantially parallel to each other and are spaced from each other a distance that is greater than the transverse width of central body 32 of first clamping member 28, so that when upper surface 40 of first clamping member 28 is in surface-to-surface contact with lower surface 52 of second clamping member 30, ridges 64 and 66 are opposite the side surfaces of central body 32.

As best seen in FIG. 3, each of ridges 64, 66 includes a respective inner surface 68, 70 that is inclined relative to lower surface 52 and that together define an outwardly-diverging included angle therebetween. The spacing between the respective points of intersection 72, 74 at which inner surfaces 68, 70 meet lower surface 52 corresponds substantially with the width of central body 32 of first clamping member 28. The angle of inclination of inner surfaces 68, 70 relative to lower surface 52 can range from about 100° to about 140°, preferably from about 115° to about 125°, and most preferably from about 118° to about 122°. The spacing between points 72, 74 and the inclination of inner surfaces 68, 70 can be selected to limit the angular misaliignment that can exist between first and second clamping members 28, 30 when tube clamp 26 is in its assembled condition. The angular misalignment referred to herein is the angle defined between the longitudinal axes of each of first and second clamping members 28, 30. For example, those parameters can be selected to limit the maximum angular misalignment to an angle of no larger than about 3°, in order not to allow outer edges of element-engaging surfaces of the clamping members to produce irregular contact and wear, or indent the outer surface of the engaged element.

The provision of inner surfaces 68, 70 serves to facilitate assembly of clamp 26. By manually pressing lower surface 52 of second clamping member 30 against upper surface 40 of first clamping member 28 during clamp assembly, inner surfaces 68, 70 will engage the edges of central body 32 of first clamping member 28 and cause second clamping member 30 to pivot relative to first clamping member 28. The pivotal movement corrects for any longitudinal misalignment between the clamping members, and therefore inner surfaces 68, 70 serve as alignment surfaces during clamp assembly.

In addition to the alignment function provided by inner surfaces 68, 70 of depending ridges 64, 66, the ridges also serve to stiffen central body 46. As a result, the tendency of central body 46 to bend about a transverse axis, relative to the assembled clamping members, when first and second clamping elements 28, 30 are drawn together by the tightening of a connecting bolt, is significantly reduced. Such bending can occur if there is not substantial surface-to-surface contact between lower surface 52 of second clamping element 30 and upper surface 40 of first clamping element 28. In that instance, the higher rigidity of central body 46 of second clamping element 30 resulting from the provision of ridges 64, 66 causes the clamping force applied to the outer surface of the clamped member to be higher than it would be if bending of central body 46 were allowed to occur. Moreover, the stiffening effect provided by the ridges allows the thickness of central body 46 to be reduced, thereby saving weight.

An additional benefit of the configuration of the clamping members as shown is a reduction of the length of the connecting bolt for connecting together the two clamping members, with a consequent reduction of the weight of the clamping assembly. Because the two clamping members are configured differently, they must be assembled in the correct manner. In that regard, if second clamping member 30 were to be positioned against the clamp supporting surface, such as surface 24 shown in FIG. 1, which would reduce the desired surface-to-surface contact area between the clamping member and the clamp support surface, assembly of the clamping members could not properly be effected. Because first clamping member would be uppermost the connecting nut could not be engaged with the connecting bolt as the distance from the supporting surface to the uppermost surface of the clamping assembly would be too great.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the invention.

What is claimed is:

1. A support for engaging and holding an elongated member, said support comprising:

a. a first clamp member having a longitudinal axis and including a body portion and a first recess positioned adjacent a longitudinal end of the first clamp member body portion, the first recess having a first longitudinal axis for engaging an outer surface of the elongated member;

b. a second clamp member having a longitudinal axis and including a body portion and a second recess positioned adjacent a longitudinal end of the second clamp member body portion, the second recess having a second longitudinal axis for engaging the outer surface of the elongated member;

c. wherein at least one of the first clamp member body portion and the second clamp member body portion includes an alignment surface that extends along at least one edge of the body portion of the at least one of the first and second clamp members, wherein the alignment surface is inclined relative to a top surface of the respective clamp member body portion and is spaced from the respective recess for orienting the first and second clamp members relative to each other so that the first and second recesses are opposite each other and the longitudinal axes of the first and second recesses are substantially parallel to each other, wherein the inclination of the alignment surface is from about 100° to about 140° and the alignment surface extends in a direction substantially parallel to the clamp member longitudinal axis and is positioned to abut an outer side edge of the other of the first clamp member body portion and the second clamp member body portion; and d. wherein the first and second clamp members include means for receiving a connecting member to hold the clamp members against the outer surface of the elongated member.

2. A support in accordance with claim 1, wherein the first and second recesses define arcuate surfaces.

3. A support in accordance with claim 2, wherein each of the arcuate surfaces is defined by a substantially circular arc.

4. A support in accordance with claim 3, wherein the substantially circular arcs have substantially the same radius of curvature.

5. A support in accordance with claim 1, wherein each of the first and second clamp members includes a plurality of recesses for receiving and holding a plurality of elongated members.

6. A support in accordance with claim 1, wherein a pair of alignment surfaces is provided, and wherein the alignment surfaces are substantially parallel to each other.

7. A support in accordance with claim 1, wherein each of the first and second clamp members includes a plurality of recesses for receiving and holding a plurality of tubular members.

8. A support in accordance with claim 7, wherein the first and second recesses define arcuate surfaces.

9. A support in accordance with claim 1, including a support bracket, wherein a connection member holds the first and second clamp body portions together and against the support bracket.

* * * * *